United States Patent

[11] 3,551,709

[72] Inventor Miklos Kemenczky
       Point Pleasant Beach, N.J.
[21] Appl. No. 739,680
[22] Filed June 25, 1968
[45] Patented Dec. 29, 1970
[73] Assignee Paul Guidlen
       New York, N.Y.

[54] IMPROVEMENTS IN PYROMAGNETIC MOTORS
     14 Claims, 9 Drawing Figs.
[52] U.S. Cl. .................................................. 310/4,
                                                    40/30; 46/243
[51] Int. Cl. ................................................ H02n 7/00
[50] Field of Search ..................................... 310/4;
           318/116; 60/23; 40/106.45, 30, (Inquired);
                                   46/243RMO, (Inquired)

[56]                References Cited
              UNITED STATES PATENTS
476,983    6/1892   Edison ........................... 310/4

| | | | |
|---|---|---|---|
| 1,431,545 | 10/1922 | Schwartz ................ | 310/4 |
| 1,716,091 | 6/1929 | Schwartz ................ | 310/4 |
| 3,198,969 | 8/1965 | Kolm et al. ............. | 310/4 |
| FOREIGN PATENTS | | | |
| 378,881 | 2/1940 | Italy ....................... | 310/4 |
| 16,709 | 4/1888 | Great Britain .......... | 310/4 |

Primary Examiner—Milton O. Hirshfield
Assistant Examiner—D. G. Duggan
Attorney—Watson, Leavenworth and Kelton ABSTRACT: A pyromagnetic motor of the type including a radiant energy source and means confining source emissions to a localized sector of the ferromagnetic rotor lying within the magnetic field of a stator magnet wherein the surface of the stator magnet is made reflective to incident radiant energy. A radiant energy reflective element is associated with the stator magnet to direct onto the sector radiations emanating from both the source and the sector itself thereby increasing irradiation of the sector and averting deleterious heating of the magnet.

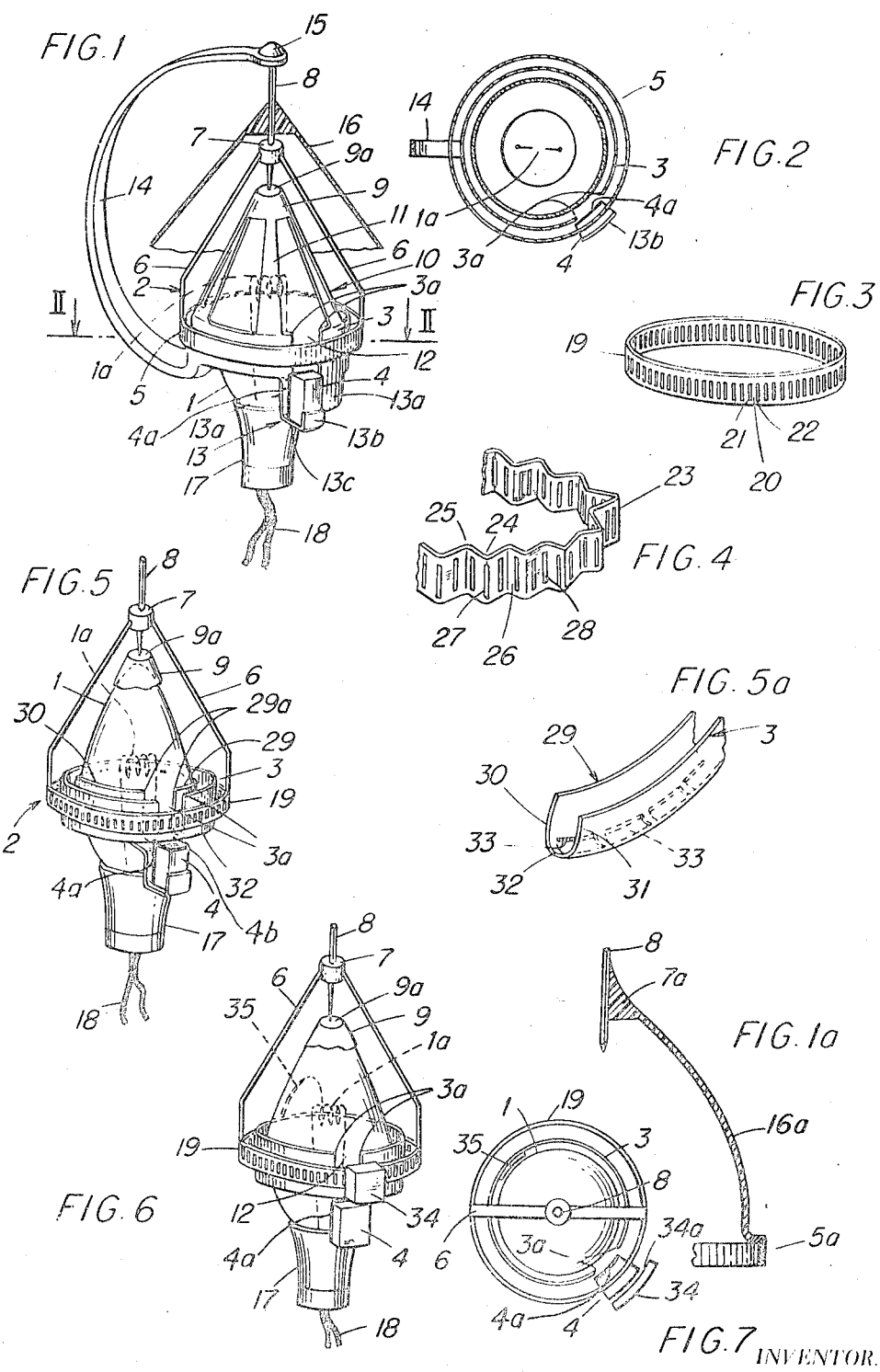

IMPROVEMENTS IN PYROMAGNETIC MOTORS

BACKGROUND OF THE INVENTION

This invention relates to improved apparatus for converting heat energy into mechanical energy through the agency of a magnetic field. The invention is based on the principal that the permeability of a member of ferromagnetic material decreased upon sufficient heating of the member. The magnetic force of attraction existing between an associated magnet and the member decreases accordingly giving rise to displacement of the member. More particularly, the invention relates to a low cost, lightweight pyromagnetic motor employing his principle and operating at relatively low temperatures in response to heat energy provided by an infrared radiator, such as a conventional incandescent lamp. In a preferred embodiment of the invention, the pyromagnetic motor derives its motive power from a Christmas tree bulb and causes an ornamental appendage to rotate about the bulb.

In a copending patent application, Ser. No. 652,531, filed Jul. 11, 1967, now U.S. Pat. No. 3,500,076, applicant disclosed a pyromagnetic motor comprising a stator magnet, a rotor including a ferromagnetic surface, a radiant energy source and means concentrating source emissions on a rotor sector to irradiate same. Applicant also disclosed in his copending application further embodiments of the pyromagnetic motor wherein the ferromagnetic rotor was comprised of elemental ferromagnetic areas which were essentially in thermal isolation from one another and wherein the irradiated surface of such isolated elemental areas were treated to increase the rate of absorption and rate of emission of incident radiant energy by the rotor. In his copending application, applicant provided an extensive treatment of prior art pyromagnetic motors indicating particularly the bulkiness, inefficiency, and high power source requirements of such motors.

SUMMARY OF THE INVENTION

While it has been found that each of the three pyromagnetic motor embodiments disclosed and claimed by applicant in said copending application are highly efficient in converting radiant energy to power usable for sustained rotation of ornamental device appended to the motor, applicant has found that the efficiency and hence power output of each of these pyromagnetic motors may be further improved by rendering the surface of the stator magnet reflective to incident energy.

By the inclusion of such reflective surface, energy emitted by an irradiated rotor section is redirected into the section. Also, random radiations emanating from the motor radiation source and not initially impinging on the rotor are caused to be directed onto the rotor sector being irradiated. This utilization of heretofore wasted energy results in increased heating of the irradiated rotor sector without the need for a like increase in power source capacity. Since the permeability of the irradiated rotor sections is increasingly diminished the force of magnetic attraction between such sections and the stator magnet is likewise further diminished. As in the motors of applicant's copending application, adjacent sections of the rotor which are unexposed to radiant energy and which lie within the field of the stator magnet remain unheated and of high permeability and are rotatively displaced by magnetic attraction into a position of exposure to the radiant energy source. Such rotative displacement in the motor of the present invention is effected by a magnetic force of increased magnitude over that in applicant's previously disclosed motors by reason of the increasingly diminished permeability of the irradiated sector. In effect, applicant has reduced the force tending to oppose the rotative displacement, i.e. the slight magnetic force of attraction tending to maintain the irradiated rotor section in its centered position in the field of the stator magnet. As in applicant's prior motors, the cyclic degradation and restoration of permeability of successive rotor sections gives rise to sustained rotation of the rotor.

In the motor structures set forth in applicant's copending application the stator magnet was subjected to some heating by irradiation and as a result the magnetic field of the stator magnet was diminished from its magnitude at ambient temperature. By rendering the surface of the stator magnet reflective to irradiation, applicant has effectively reduced the operating temperature of the stator magnet. The magnet force tending to cause rotation, i.e. the force between the magnet and adjacent unheated rotor portions, is thereby increased since overheating of the magnet and consequent reduction of the magnet field thereof is averted.

An object of the invention is to provide an improved pyromagnetic motor in which heretofore unused output of the source of radiation is utilized to develop more effective displacement of the rotor.

A further object of the invention is to reduce operating temperatures of the stator magnet in a pyromagnetic motor to thereby maximize the stator magnet field under operating conditions.

The above and other objects, features and advantages of the invention will be apparent from the following more particular description of the preferred embodiments of the invention which are illustrated in the accompanying drawings wherein like numerals identify similar parts throughout.

BRIEF DESCRIPTION OF THE DRAWINGS

FIG. 1 is a perspective view of a pyromagnetic motor constituted in accordance with the principles of the present invention, the motor being used to rotate a display device, portions of the display device being broken away to show constructional details of the motor.

FIG. 1a is a fragmentary elevational view of a modified form of the pyromotor of FIG. 1 wherein the display device and the rotor elements are fabricated as an integral unit.

FIG. 2 is a sectional view of the pyromagnetic motor shown in FIG. 1 as taken along the line II–II.

FIG. 3 is a perspective view of another form of the rotor which may be employed in the invention.

FIG. 4 is a fragmentary perspective view of further embodiment of the rotor wherein it has a corrugated structure.

FIG. 5 is a perspective view of a modified form of the pyromagnetic motor wherein dual shields are employed.

FIG. 5a is a fragmentary perspective view of a preferred embodiment of the dual shields of FIG. 5.

FIG. 6 is a perspective view of a further embodiment of the pyromagnetic motor of the invention.

FIG. 7 is a top plan view of the pyromagnetic motor shown in FIG. 6.

DESCRIPTION OF THE PREFERRED EMBODIMENTS

In FIG. 1 the pyromagnetic motor of the invention is illustrated in its use as a motive power source for a rotary appendage to an incandescent lamp. The pyromagnetic motor comprises an incandescent lamp 1 having a filament 1a which radiates infrared energy, a rotor assembly 2, an infrared shield 3 and a stator magnet 4. The face of stator magnet 4 disposed in the path of radiation of the infrared energy source is covered by a reflective layer 4a.

Rotor assembly 2 comprises a ferromagnetic rotor element 5 in the form of a continuous thin-walled cylinder or ring, a rotor cage 6, and a hub 7. Hub 7 is fixedly connected to a spindle 8. One end of spindle 8 is supported for rotation by bearing surface 9a of the crown 9 of a shroud 10 which is in turn supported by lamp 1. Shroud 10 further comprises hanger strips 11, which bear on the surface of lamp 1 to clasp the shroud in position on the lamp. Shield 3, which is affixed to and supported by hanger strips 11, consists of a ring having ends 3a defining therebetween an exposure window 12. A bracket 13 is connected to shield 3 for supporting stator magnet 4, the bracket comprising sidewalls 13a and 13b and a transverse member 14c. A C-shaped arm 14 is fixedly connected to shield 3 at one end and terminates above the lamp in an upper bearing 15 in which spindle 8 rotates. A display device 16 is fixed to spindle 8 for rotation therewith. Lamp 1, which may be any conventional incandescent lamp is supplied with excitation through lamp socket 17 and electrical conductors 18.

In operation of the pyromagnetic motor of FIG. 1, infrared radiations emanating from filament 1a are restrictively applied to that sector of rotor 5 which is juxtaposed with exposure window 12.

Shield 3 is formed of any suitable material which is opaque to infrared radiation thereby maintaining all unexposed portions of rotor element 5 unheated by virtue of their location in the insulating shadow of the shield. In addition to this insulating characteristic, the shield inner surface juxtaposed with the energy source is polished thus reflecting incident infrared radiations back toward their source and concentrating radiations at the exposure window. The outer surface of the shield is also polished so that as the shield becomes heated, the amount of secondary radiation emitted by the shield to the unexposed portions of the rotor is minimized.

As discussed above, one face of stator magnet 4 is disposed in the pat of radiations emanating from filament 1a. In the absence of reflective layer 4a, such radiations are absorbed by the magnet and increase the operating temperature thereof, giving rise to a reduction in the stator magnet field. Further, these radiations are ineffective to heat the exposed portion of rotor 5. By the association with magnet 4 of radiant energy reflective layer 4a, absorption of energy by magnet 4 is substantially eliminated. In addition, these radiations are reflected by surface 4a into the vicinity of exposure window 12 and tend to be absorbed by the exposed portion of rotor 5.

Rotor 5 is comprised of any ferromagnetic material which exhibits permeability change with temperature below the temperature to which the rotor can be heated by the motor heat source. In the preferred embodiment of FIG. 1, in which infrared radiations issuing from incandescent lamp constitute the motor heat source, this temperature of the rotor is approximately 105° F. A suitable ferromagnetic material has been determined to be a 30 percent nickel-iron alloy which exhibits a linear permeability degradation of one unit upon a temperature increment of about 1.5° F. over the temperature range of 0° to 120° F. in the environment of a magnetic field of 46 Oersteds. The inner surface of rotor element 5 is coarse and black in order to achieve fast and efficient heat absorption. The outer surface of the rotor element 5 is likewise matte and black to enhance reemission of absorbed heat to ambient space. Upon irradiation of the exposed sector of the rotor 5, thermal degradation of the permeability thereof occurs and the material becomes less permeable. As may be noted from FIG. 1, stator magnet 4 encloses a portion of the rotor including this irradiated sector within its field. As a result of the permeability differential between this irradiated sector and the adjacent unheated sector in the field of the magnet, a resultant force of magnetic attraction between the higher permeability rotor material in the adjacent sector and the magnet rotatively displaces the rotor element, thus exposing the adjacent higher permeability sector of the rotor to irradiation. The former irradiated and lower permeability sector is displaced into the insulating shadow of shield 3 where it is protected from further irradiation. By reason of the coarse and black surfaces of the rotor, absorbed heat is reemitted to the ambient space. The sector cools by radiant emission to space and also be convention with ambient air, and the sector is restored to the normal higher permeability state. This cyclic thermal degradation and restoration of rotor permeability provides a sustained rotation of the rotor element 5.

By the presence of reflective layer 4a, the above described magnetic force of attraction inducing rotation is increased in magnitude and at the same time the magnetic force opposing rotation is reduced in magnitude. The increase in the force inducing rotation results from the prevention by layer 4a of deleterious absorption of incident radiation by stator magnet 4a. The decrease in the force opposing rotation, which force is dependent on the permeability of the irradiated sector of rotor 5, results from the increased heating of this sector by the redirection of radiation heretofore absorbed by the stator to the irradiated section.

The incremental increases in resultant force inducing rotation of rotor 5 is particularly significant in view of the basic limitations of the power source in the apparatus of FIG. 1, namely, an incandescent lamp. Efficient conversion of the available radiant energy from such a source is a paramount factor in the compromise involving such other factors as manufacturing tolerances, desired speed of rotation, allowable ornament weight, etc.

As rotor element 5 rotates, like rotation is imparted to spindle 8 which is directly linked to the rotor element through rotor cage 6 and hub 7. Spindle 8 resists lateral displacement by reason of the residence of one end thereof in bearing 15 and the other end in bearing 9a. In this manner any tendency for rotor assembly 2 to tilt under the influence of magnet 4 is resisted. The double bearing arrangement also permits free rotation of the device in any position. Spindle 8 thus drives display device 16 symmetrically about lamp 1.

It will be noted from the preferred embodiment of FIG. 1 that the pyromagnetic motor depends structurally on lamp 1 only for the support of shroud 10. Thus conventional incandescent lamps of various sizes may be employed to power the motor. The strict spacial relationship of stator magnet 4, rotor element 5 and shield 3 required for operation of the motor is preserved entirely by the mechanical interrelationship of these elements and shroud 10. It is preferable in manufacture of the motor to fabricate shroud 10, shield 3 and C-shaped arm 14 as a unitary element, e.g. by stamping or molding the assembly from a suitable metal or plastic. In a simplified and special arrangement, rotor cage 6 may be eliminated from the motor structure. In this case, ornament 16a (FIG. 1a) extends from hub 7a and the lower portion of the ornament is connected to and supports rotor element 5a. To permit cooling of the rotor by convention, apertures may be provided in the lower portion of the ornament.

The improvement of the present invention is similarly effective to increase the resultant magnetic force inducing rotation of applicant's alternate rotor embodiments (FIGS. 3 and 4). These embodiments were disclosed in copending application Ser. No. 652,531 as substitutes for the rotor 5 in the motor of FIG. 1.

Rotor 19 of FIG. 3 comprises a ring of ferromagnetic material which is subdivided into a plurality of elemental sections 20 defined by slits 21 and 22 which constitute minute openings in the rotor. Alternatively, the rotor may be comprised of a thin-walled ring of low heat conductivity having elemental areas of ferromagnetic material disposed therein. Basically, this rotor defines a structure in which elemental ferromagnetic areas are in substantial thermal isolation from one another. As in the rotor of FIG. 1, the elemental areas are coarse and black to provide fast absorption and reemission of absorbed heat. By virtue of this thermal isolation, transfer of heat by conduction within the rotor is minimized with the result that only the exposed irradiation area of the rotor element 19 undergoes heating. Degradation of permeability in the adjacent section due to conduction of heat from the irradiated sections, which necessarily occurs to some extent in the rotor element 5 of FIG. 1, is substantially reduced. The permeability differential in the rotor 19 is thus of greater magnitude than that of rotor 5 and provides an increased force of magnetic attraction. As a result torque and rotor angular velocity improve and load capacity increases. It should be noted that load capacity or torque rises under increasing load since slower rotation under load lengthens the heating and cooling portions of the cycle of operation. Limiting the spread of heat by conduction also facilitates air cooling as it tends to maintain a higher temperature differential between each heated section and ambient space and therefore a more rapid emission of absorbed heat.

When rotor 19 of FIG. 3 is employed in place of rotor 5 in the motor of FIG. 1, reflective layer 4a again contributes to the heating of the exposed elemental and thermally isolated areas 20 by redirecting incident energy into the vicinity of exposure window 12, thus reducing the magnetic force tending to oppose displacement of rotor 19. The magnetic force inducing rotation is again increased as a result of the reduced heating of the stator magnet.

In the further alternate rotor structure of FIG. 4, rotor 23 is a corrugated version of rotor 19 having ridges 24 and grooves 25 along with slits 27 and 28, adjacent slits defining elemental areas 26. When such a structure is employed in place of rotor 5 in the motor of FIG. 1, the rotor mass lying within the field of stator magnet 4 is increased considerably giving rise to greater forces of magnetic attraction. This is accomplished without an accompanying increase in the thickness of the rotor which would decrease the ratio of surface area to total mass. This ratio is of concern in applicant's pyromagnetic motors since the rapidity of heating and cooling is directly proportional to the ratio. On the other hand, the torque of any pyromagnetic motor is proportional to rotor mass within the magnetic field. In rotor 23 mass is increased without adversely affecting the rapidity of heating and cooling the rotor. Thus rotor 23 operates with the efficiency of rotor 19 of FIG. 3 and with increased torque and rotational velocity.

The effects of reflective layer 4a on operation of the motor of FIG. 1 incorporating rotor 23 are of the same nature and extent as those discussed previously in connection with rotors 5 and 19.

The two alternate motor embodiments of applicant's copending application are shown in FIGS. 5 to 7 modified in accordance with the present invention. In these FIGS. certain of the support structure of FIG. 1 is removed for clarity. In the motor of FIG. 5 an additional infrared radiation shield 29 is interposed between shield 3 and incandescent lamp 1. A preferred embodiment of the dual shield is shown in FIG. 5a and comprises a trough-shaped ring having an inner wall 30 and an outer wall 31 connected together by an arcuate base 32. The wall 30 constitutes inner shield 29 (FIG. 5) and the wall 31 constitutes outer shield 3. Spaced apart slotted openings 33 are formed in arcuate base 32 to permit passage of cooling ambient air between shields. Referring gain to FIG. 5, the separated ends 3a and 29a of the shields are aligned to define exposure window 12 which provides restricted irradiation of rotor element 19. This dual shield arrangement provides increased protection of unexposed elemental areas 20 of rotor 19 from infrared radiation emanating from filament 1a. Like effects of improved elemental area irradiation and increased stator magnetic field result from the incorporation of reflective member 4a in the motor of FIG. 5.

In the motor of FIG. 6 several reflectors are added to the pyromagnetic motor structure to maximize irradiation of elemental areas 20 of rotor 19 which are exposed to infrared radiation. A mirror 34 having a reflective surface 34a is supported in a position of alignment with filament 1a and exposure window 12. The mirror 34 is positioned outside of stator magnet 4 and preferably extends above and below the rotor element 19 to collect primary infrared radiation passing over motor 19 and secondary radiation emanating from the matte and black outer surface of the rotor itself. The reflective surface 34a is so designed to reflect such radiation on the exterior side of the rotor thereby accelerating thermal degradation of permeability in the exposed elemental areas. A further reflective element 35 is positioned on shield 3 at a location which is reciprocal to that of exposure window 12 defined by shield ends 3a, i.e. the center of reflector 35 is approximately 180° from the center of the exposure window. This reflector is designed to redirect incident infrared radiation on to the exposed elemental areas 20 of rotor 19 for the purpose of further increasing thermal degradation of permeability of the exposed rotor elemental areas. Reflector 35 may be formed in any conventional manner such as by enlarging the polished inner surface of shield 3 locally at that area as is shown in FIG. 6. Suitable support means such as have been shown in FIG. 1 may be provided for reflector 34, the only requirement for such support being that a fixed spatial relationship exist between the shield 3, stator magnet 4 and reflector 34. Radiant energy reflective member 4a is applied to magnet 4 to provide reflection of stray radiation not entrapped by reflector 34 and to isolate the stator magnet from heating by irradiation.

While the subject invention has been shown in the particular application of providing motive power for a display device appended to an incandescent lamp, the invention lends itself readily to providing rotary motive power for toys, mobile advertisements or the like. In this connection, it should be noted that any form of infrared radiator may be employed as the heat source for the pyromagnetic motor, such as an ignited cigarette or incense, sunlight or the like, provided that it is capable of irradiating the rotor sufficiently to increase the temperature thereof to cause degradation of rotor permeability. Moreover, the invention contemplates the usage of any radiant energy capable of degrading the permeability of a ferromagnetic material. While the radiant energy source has been shown in the illustrated embodiment in a position within the pyromagnetic motor, by appropriate rearrangement of the shield 3 externally of rotor element 5, the source may be positioned externally of the motor. The shield structure itself may be greatly simplified in certain applications by applying shielding coatings directly to the radiant energy source. A radiant energy source having an output characteristic such that no divergence exists in radiations emanating from the source (e.g. a simple optical system or laser) will permit elimination of the shield from the motor structure itself. In such cases, the required localization of thermal degradation of permeability it accomplished in the radiator itself.

The radiant energy reflective element 4a may be incorporated in the various motor embodiments by applying same to stator magnet 4 in any suitable manner. For example, the element may take the form of a radiant energy reflective coating, such as silver, applied to the surface of the magnet and coextensively covering same. Other suitable forms of the reflective elements include aluminum, nickel, paint, chromium or heavily oxidizable metals. Alternatively, the element may be fabricated as a separate element and then affixed to the face of the magnet to cover same. As shown in FIG. 5, a second reflective element 4b may be associated with the upper surface of the magnet. In general, it may be stated that such elements may be associated with any surfaces of the stator magnet which are in the path of stray radiations emanating from exposure window 12 or the rotor element to accomplish the benefit of this invention.

While the invention has been particularly shown and described with reference to a preferred embodiment thereof, it will be understood by those skilled in the art that various changes in form and detail may be made without departing from the spirit and scope of the invention.

I claim:

1. In a pyromagnetic motor comprising a rotor having an encircling ferromagnetic surface, a stator magnet having a magnetic field which encloses a portion of said ferromagnetic surface, a source emitting radiant energy, and means for controlling application of said radiant energy to said rotor to concentrate said energy on a sector of said portion of said ferromagnetic surface for decreasing the magnetic permeability of said sector, thereby establishing a permeability differential between said sector and the remainder of said portion inducing rotation of said rotor, the improvement which comprises radiant energy reflective means in association with said stator magnet and adapted to direct onto said sector radiations incident on said stator magnet and emanating from said source and said sector of said portion of said ferromagnetic surface.

2. The pyromagnetic motor of claim 1 wherein said radiant energy reflective means comprises an element affixed to and coextensively covering particular faces of said stator magnet in the path of said radiations.

3. The pyromagnetic motor of claim 2 wherein said radiant energy reflective element comprises a coating of silver on said magnet faces.

4. The pyromagnetic motor of claim 1, further comprising means incorporated in said rotor to increase the rate of absorption and rate of emission of incident radiant energy of said ferromagnetic surface.

5. The pyromagnetic motor of claim 1, wherein said ferromagnetic surface comprises a plurality of elemental ferromagnetic sections, adjacent elemental sections being substantially in thermal isolation from one another.

6. The pyromagnetic motor of claim 5, wherein said rotor is a cylinder and the ferromagnetic surface of said cylinder contains a plurality of openings extending between the ends of said cylinder the surfaces between adjacent openings constituting said elemental sections.

7. The pyromagnetic motor of claim 1, wherein said ferromagnetic surface is corrugated.

8. The pyromagnetic motor of claim 1, wherein said source emitting radiant energy is encircled by said rotor.

9. The pyromagnetic motor of claim 8, wherein said source is an infrared radiator.

10. The pyromagnetic motor of claim 8, wherein said means controlling application of radiant energy to said sector comprises a shield disposed between said source emitting radiant energy and said rotor, the inner surface of said shield having a part reflective to radiations emanating from said source and a part nonreflective to such radiations, said nonreflective part registering with said sector.

11. The pyromagnetic motor of claim 10, wherein the outer surface of said shield comprises a part reflective to radiant energy and a part nonreflective to such radiation, said nonreflective part registering with said sector.

12. The pyromagnetic motor of claim 10 including a radiant energy reflector disposed exteriorly of said rotor and said stator magnet and facing said nonreflective part of said shield.

13. An ornamental device comprising the pyromagnetic motor of claim 1 and a display device fixed to said rotor to rotate therewith.

14. The ornamental device of claim 13 wherein said source is an incandescent lamp.

UNITED STATES PATENT OFFICE
CERTIFICATE OF CORRECTION

Patent No. 3,551,709　　　　　　　Dated December 29, 1970

Inventor(s) Miklos Kemenczky

It is certified that error appears in the above-identified patent and that said Letters Patent are hereby corrected as shown below:

Col. 1, line 8, "decreased" should read --decreases--.
Col. 1, line 13, "his" should read --this--.
Col. 2, line 72, "14c" should read --13c--.
Col. 3, line 19, "pat" should read --path--.
Col. 3, line 61, "be" should read --by--.
Col. 3, line 61, "convention" should read --convection--.
Col. 4, line 33, "convention" should read --convection--.
Col. 5, line 36, "gain" should read --again--.
Col. 5, lines 65-66, "conventional" should read --convenient--
Col. 6, line 24, "it" should read --is--.

Signed and sealed this 11th day of May 1971.

(SEAL)
Attest:

EDWARD M. FLETCHER, JR.　　　　　　WILLIAM E. SCHUYLER, JR.
Attesting Officer　　　　　　　　　Commissioner of Patents